Sept. 9, 1969 D. J. SINNOTT 3,466,604
APPARATUS FOR AUTOMATIC JUSTIFICATION OF LINE-CASTING
MATRICES ASSEMBLED BY A CODED TAPE
Filed Aug. 10, 1966 6 Sheets-Sheet 1

INVENTOR.
DAVID J. SINNOTT
BY
Norman N. Holland
ATTORNEY

APPARATUS FOR AUTOMATIC JUSTIFICATION OF LINE-CASTING MATRICES ASSEMBLED BY A CODED TAPE

Filed Aug. 10, 1966 6 Sheets-Sheet 2

INVENTOR
DAVID J. SINNOTT
BY Norman N. Holland
ATTORNEY

INVENTOR.
DAVID J. SINNOTT
BY
Norman N. Holland
ATTORNEY

Sept. 9, 1969 D. J. SINNOTT 3,466,604

APPARATUS FOR AUTOMATIC JUSTIFICATION OF LINE-CASTING MATRICES ASSEMBLED BY A CODED TAPE

Filed Aug. 10, 1966 6 Sheets-Sheet 4

INVENTOR.
DAVID J. SINNOTT

BY

Norman N. Holland

ATTORNEY

INVENTOR.
DAVID J. SINNOTT
BY Norman N. Holland
ATTORNEY

INVENTOR.
DAVID J. SINNOTT
BY
[signature]
ATTORNEY

United States Patent Office 3,466,604
Patented Sept. 9, 1969

3,466,604

APPARATUS FOR AUTOMATIC JUSTIFICATION OF LINE-CASTING MATRICES ASSEMBLED BY A CODED TAPE

David J. Sinnott, Ringwood, N.J., assignor to Powers & Eaton Industries, Inc., South Hackensack, N.J., a corporation of New Jersey Filed Aug. 10, 1966, Ser. No. 571,493
Int. Cl. H04q *1/18*
U.S. Cl. 340—147 30 Claims This invention relates to the automatic operation of line-casting machines and is directed particularly to the automatic justification of assembled matrices.

Line-casting machines are automatically operated by electronic control devices such as the autosetter described in Patent No. 3,208,040. The autosetter reads a tape with coded indicia and electrically operates the line-casting machine in response to this indicia. However, an autosetter cannot automatically justify a line of type. The tape must have coded indicia dividing the lines into justifiable lengths. This requires that the length of each line of type must be determined prior to making the tape. A tape containing this information is a programmed tape.

Programmed tapes are commonly prepared by applying an unprogrammed tape to a machine which simulates the operation of a line-casting machine. The simulating machine determines the spacing between words in a line of type to form a justifiable length of line for fitting in a given column width. A new tape is punched with elevation commands at the end of each justifiable line. This programmed tape operates a line-casting machine.

This present procedure has the disadvantage of requiring two tapes to be punched in order to automatically assemble justifiable lines of matrices. Further, the programmed tape is then restricted to producing lines of type of single column width, thus making the tape unavailable for use in different types of compositions.

It is, therefore, very desirable to provide an electrical device capable of assembling justified lines of matrices from an unprogrammed tape. An electrical device eliminates the need for additional equipment and provides a higher degree of versatility in the utilization of tape.

An additional desirable feature with either automatic justification or command justification is automatic indentation of successive lines of type. The indention process is controlled by coded indicia on the tape whether programmed or unprogrammed.

An object of the invention is to form automatically justified assemblages of matrices from an unprogrammed tape.

Another object of the invention is to provide an electrical device for automatically determining whether matrices assembled by an autosetter are justifiable and automatically reassembling the matrices of an unjustifiable assemblage is formed by the autosetter.

Another object of the invention is to provide an electrical mechanism automatically determining if a given assemblage is justifiable and automatically providing successive indentations of assembled matrices.

Another object of the invention is to provide automatic indentation of successive justified lines form an unprogrammed tape.

Another object of the invention is to provide an automatic justification wherein a spaceband will not be the last matrix placed into an assembly of matrices.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 6 is a detailed electrical diagram of the no-line casting and reverse components;

INTRODUCTION

Figure 1:
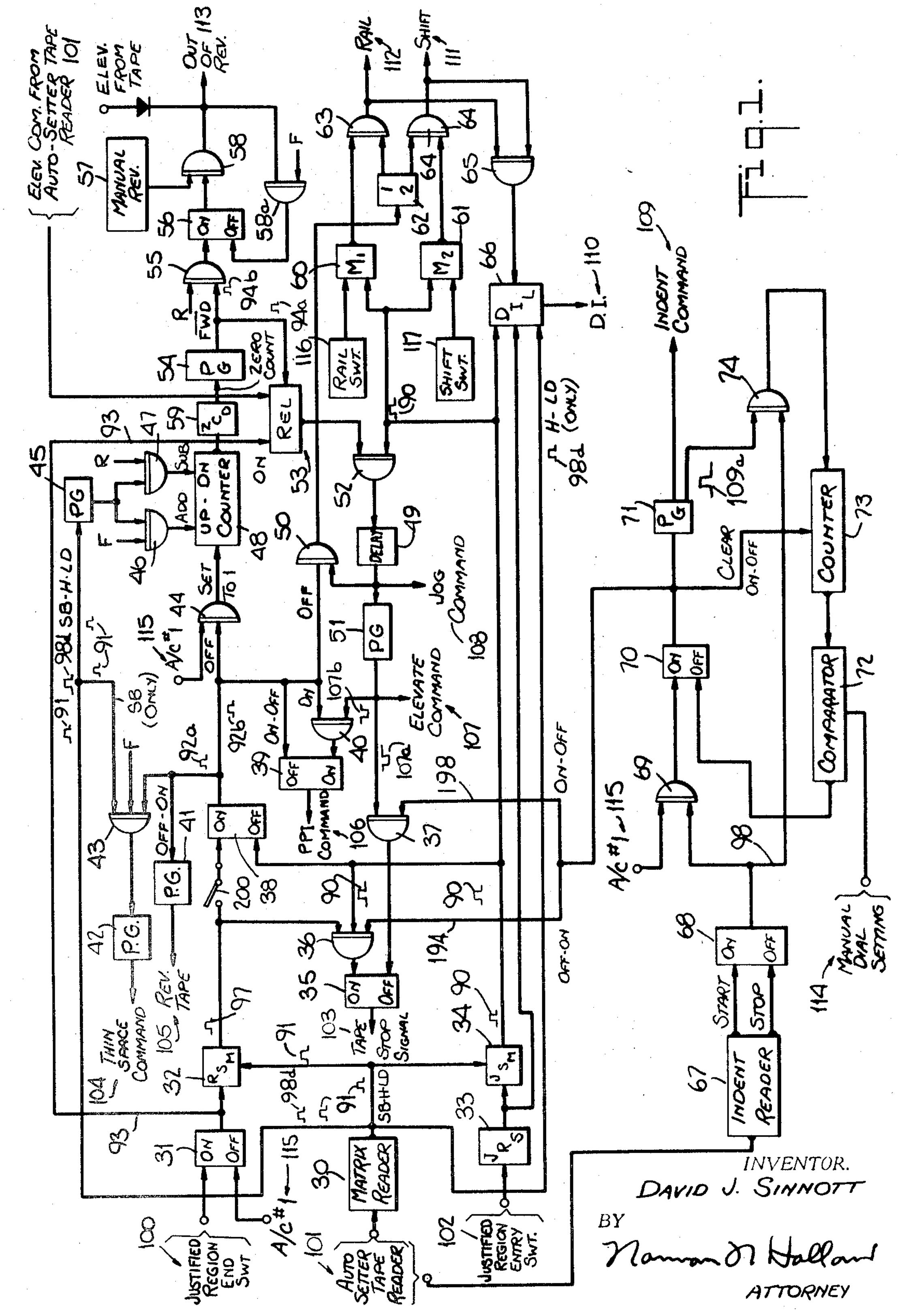
FIG. 1 is a simplified diagram illustrating the circuit of the autojustifier in accordance with the present invention.

The autojustifier of this invention may be used in connection with an autosetter of the type described in the Patent 3,208,040, and uses a punched tape coded in the manner described in that patent. The tape in that patent has coded holes for the selection of the individual matrices, spacebands, hyphen matrix and long dash matrix, as well as a code for indentation and for discontinuance of indentation. An unprogrammed tape has no code information for indicating justifiable lines. This information was added separately in the manner described above.

The autojustifier of this present invention uses the unprogrammed tape and automatically performs several functions in cooperation with an autosetter of the type described in Patent 3,208,040. The autosetter operates the line-casting machine to assemble the matrices and to perform necessary machine operations in accordance with the code on the tape.

The autojustifier determines whether an assembled line of matrices is justified. This function is accomplished by sensing the matrices being requested by the tape while assembly is occurring at the right-hand end of the assembly carriage of the line-casting machine within the justified region or justification zone. The justified region or justification zone comprises a plurality of spaces at the end of an assembled line. A line ending in this region or zone is or can be expanded into a justified line.

Each line of assembled type which has a word ending within the justified region is justified. This line of matrices is then elevated and cast. The terms justified or justification mean that the assemblage before elevation is of a length that corresponds to the exact justification length or may be expanded to the exact justification length.

Matrices are sensed which indicate whether a grammatically complete word or syllable has ended within the justified region. Any blank matrices, as well as a hyphen or long dash matrix, would be such a matrix. For simplicity the autojustifier requires that the spaceband matrix provide all blank spacing between words in a line. In addition, the extensive use of the spaceband matrix permits the justified region to be of a maximum length by taking full advantage of the telescopic effect the spaceband gives to a line of assembled type.

The justified region is of sufficient length to create a very high probability that a random assemblage of matrices will have a word ending within it. The probability of justifying type in this manner is increased further by repeating the assembly of a line which fails to justify. On reassembly the line is given a new length by inserting a thin space along with each spaceband.

The autojustifier senses the entry of the matrix assemblage into the justified region and senses from the tape the request for a spaceband, a hyphen or a long dash. The detection of any of these matrices while in the justified region indicates that the assemblage is justified. The autojustifier then proceeds to simulate and transmit to the line-casting machine the elevation command. Casting of the type automatically follows the elevation operation and the line-casting operation proceeds to the assembly of the next line.

If a spaceband, hyphen or long dash is not requested by the tape in the justification zone, then a tight line signal is developed by the autojustifier which rejects the assemblage of matrices as being unjustifiable. This assemblage is then elevated and ejected without casting. The tape is automatically reversed to the beginning of the first word of the rejected assemblage. The matrices are reassembled with the insertion of thin spaces along with the spacebands. If this reassemblage does not result in a justifiable line, the autojustifier and autosetter are stopped and the assemblage is manually justified. If a hyphen or long dash is read on the tape and a tight line signal is created the assemblage completes in the justified zone and the tight line signal is disregarded.

GENERAL DESCRIPTION

Referring to FIG. 1, the input of matrix reader 30 is connected to the tape reader 101 in the autosetter to receive tape commands sensed by the tape reader from a coded tape. The matrix reader 30 and the justified region switch 33 are connected in parallel to the justify signal means 34. On the assemblage of matrices entering the justification zone, the justified region switch 33 is operated by the justified region entry switch 102 on the line-casting machine to render the justify signal means 34 responsive to the matrix reader 30. If the tape presents a spaceband code, hyphen code or long dash code during this time, a justify signal 90 is developed by the justify signal means 34. The justify signal 90 causes (1) the tape stop signal 103 to be produced; (2) a decoder inhibit signal 110 to be generated; (3) the rail 60 and shift 61 memories to be activated; (4) a jog command 108 to be generated; and (5) an elevation command 107 to be transmitted to the line-casting machine after the first four operations have been performed.

Figure 4:
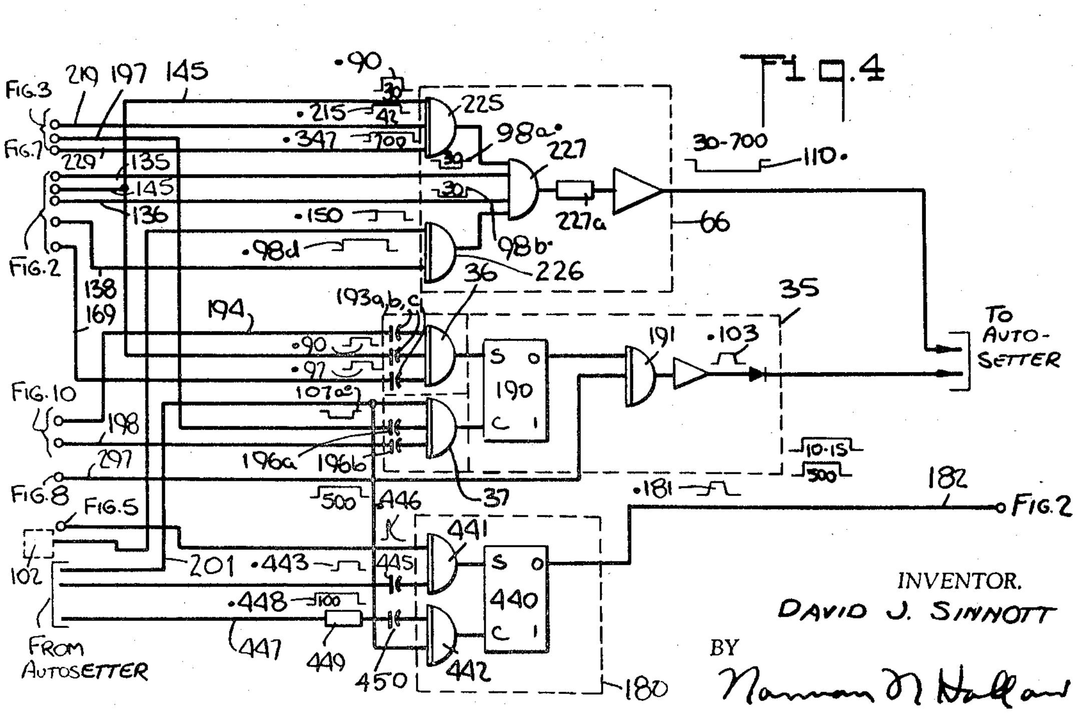
FIG. 4 is a detailed electrical diagram of the components producing the decoder inhibit, tape stop and timing inhibit signals.

The output of the justify signal means 34 (FIG. 2) is connected to the tape control switch 35 through an OR gate 36 (FIG. 4). The switch 35 is connected to the tape control in the autosetter and supplies the tape stop signal 103 thereto. When the switch 35 is ON the tape in the autosetter is stopped. The justify signal 90 turns the switch 35 to the ON condition to stop the tape. The switch 35 remains in the ON condition until the elevate command 107*a* is received through OR gate 37 on elevation of the assembled matrices.

It is preferable that a spaceband is not inserted as the last matrix in an assemblage. A decoder inhibit signal 110 (FIG. 4) is created and applied to the autosetter to prevent that operation. The justify signal 90 (FIG. 2) is applied to the decoder inhibit logic 66 (FIG. 4) indicating that either a spaceband, long dash or hyphen was read on the tape. This decoder inhibit logic 66 also receives a hyphen/long dash signal 98*d* (FIGS. 2 and 4) from the matrix reader. Absence of this latter signal permits the logic 66 to determine that a spaceband was the matrix indicating the presence of a justified assemblage. The output 110 of the decoder inhibit logic 66 is generated before the autosetter causes the spaceband to be dropped from the spaceband box on the line-casting machine. The decoder inhibit logic 66 will not generate an output 110 if a hyphen or long dash matrix determined the presence of a justified assemblage. There is no objection to either of these matrices being placed at the end of an assemblage.

During the jog period if the justified region entry switch opens up, the decoder inhibit will not occur, the spaceband will drop, no elevate will be generated and the tape will begin assembling the matrices for the next word. The line being assembled will not be justifiable until another spaceband or a hyphen or a long dash matrix is sensed by the autosetter reader.

Figure 3:
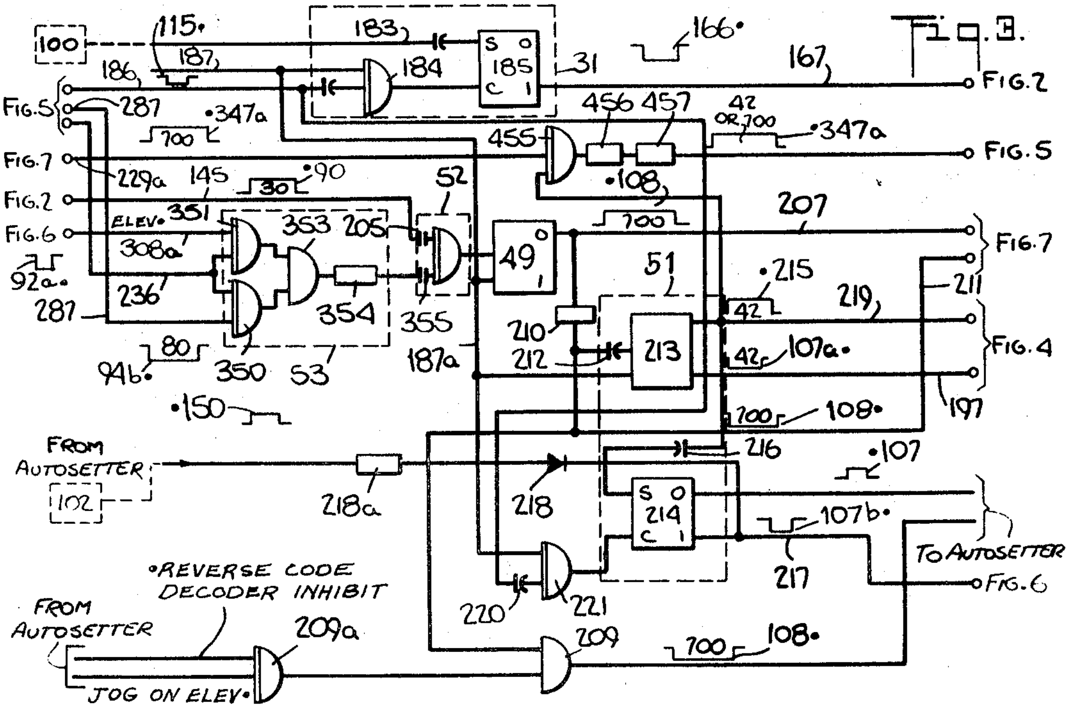
FIG. 3 is a detailed electrical diagram of the components producing the tight line, jog and elevate signals.

The output of the justify signal means 34 (FIG. 2) is also connected to the elevate delay circuit 49 through OR gate 52 (FIG. 3). The delay circuit produces jog command 108 which causes the line-casting machine to physically rock the assembled matrices to ensure that the matrices are properly seated and arranged. The output of the elevate delay circuit 59 when applied through the pulse generator 51 produces the elevate command 107 which is transmitted to the line-casting machine. The delay circuit 49 provides time for completing the assembly of the matrices and for the jogging operation. The pulse generator 51 then issues the elevation command 107 to move the assemblage for the casting of the line. Elevate signals 107*a*, *b* are also produced at this time.

At the same time that the justify signal 90 is applied to the elevate OR gate 52, it is also applied to the rail 60 and shift 61 memories. The rail 60 and shift 61 (FIG. 7) memories are connected to the rail and shift switches 116, 117 of the autosetter and record whether they are set in the upper or lower rail or the shift or unshift positions. The recording of the positions of these switches 116 and 117 at the end of each assemblage is necessary if the following assemblage of matrices is rejected and the matrices are reassembled.

The output of the pulse generator 51 (FIG. 3) is also connected to the tape control switch 35 through an OR gate 37 (FIG. 4). The elevate signal 107*a* returns the control of the tape to the autosetter by turning the tape control switch 35 (FIG. 4) off. The autosetter starts the tape running forward when it determines that the elevation of the assemblage has been completed.

Figure 8:
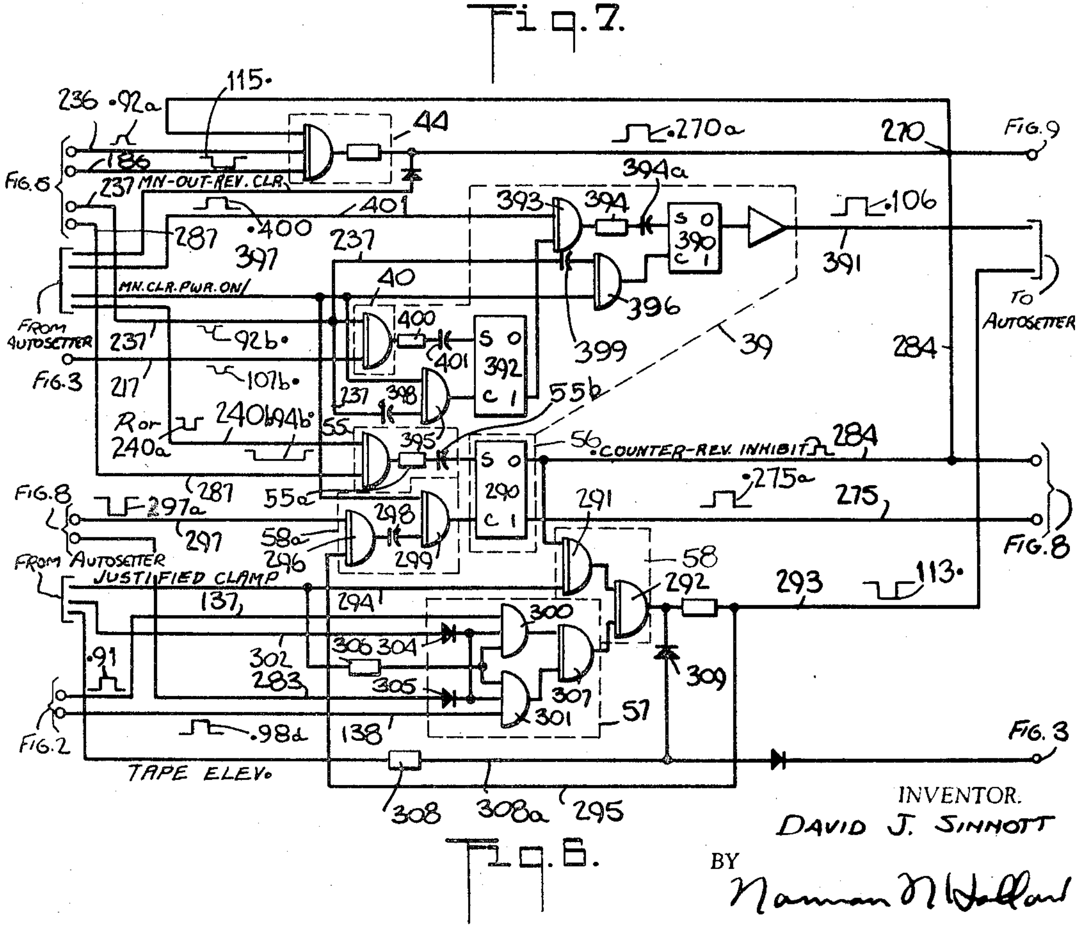
FIG. 8 is a detailed electrical diagram of the counter input control pulse generator, zero count detector and thin space pulse generator components.
Figure 8:
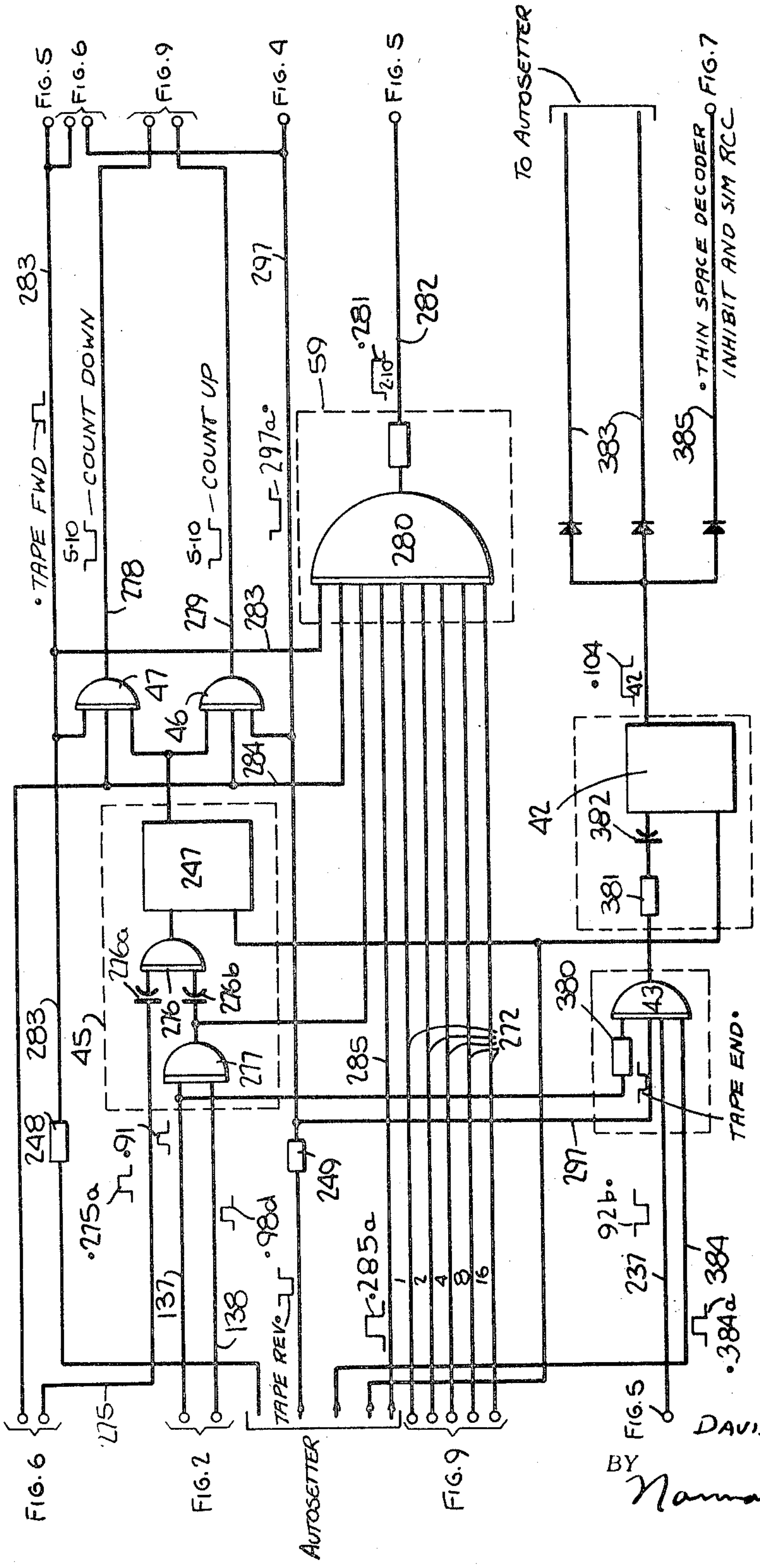

During the assembly of the matrices the up/down counter 48 (FIG. 9) is activated to count the number of words present in a line of given assemblage. Each hyphen, long dash and spaceband command issued by the tape causes a count of one to be applied to the up/down counter 48. These matrices indicate the beginning or the end of a word. The signals 91 and 98*d* from the matrix reader 30 (FIG. 2) are applied to the up/down counter 48 through the counter input control pulse generator 45 and the parallel AND gates 46 and 47. Signal 91 or 98*d* (spaceband, hyphen, long dash) from the matrix reader 30 triggers the pulse generator 45 (FIG. 8). The pulse generator 45 in turn produces a single pulse output which will be applied to the up/down counter 48 through the add OR gate 46 when the tape is moving forward or through the subtract OR gate 47 when the tape is moving in reverse.

The up/down counter 48 (FIG. 9) is set to a count of one at the start of each assembly. This count indicates the beginning of the first word in an assembly. The output of the set OR gate 44 (FIG. 6) causes the up/down counter 48 to be set to a count of one when the autoclear signal 115 from the line-casting machine is applied at its input. The autoclear signal 115 (FIG. 6) indicates that elevation of a line is complete and assembly of a new line may begin.

The up/down counter 48 counts the number of words in each line so that if an assemblage does not justify and is discarded, the number of words that the tape must be reversed is known by the autojustifier.

The justify signal 90 of the justify signal means 34 is also applied to the rejustify switch 38 (FIG. 5) to turn it off. The rejustify switch 38 is turned on when an assemblage fails to justify. The positive step function produced by this switch 38 shifting from OFF to ON on application of the rejustify signal 97 initiates the autojustifier process whereby an unjustified assemblage is discarded and reassembled. If a line fails to justify upon reassembly, a further attempt at justification cannot be made because the rejustify switch 38 will not have been turned off and thus the positive step function will not be produced when the rejustify signal 97 is applied to the switch. The rejustify switch 38 is effectively a counter which limits the autojustifier to one attempt at justification of a line by reassembly with an altered length.

An assemblage of matrices is unjustified when the matrix reader 30 does not produce a signal by the time the justified region end switch 100 is reached. When the justified region end switch 100 is reached no further matrices can be added and the entire line must be rejected. The justified region end switch on the line-casting machine is connected to the tight line switch 31 which is normally off. The tight line switch 31 when ON applies a signal to the rejustify signal means 32 (FIG. 2) causing the rejustify signal 97 to be produced. The rejustify signal 97 is applied to the OR gate 36 (FIG. 4) connected to the tape control switch 35 and turns the switch 35 on to stop the tape as did the justify signal 90. The rejustify signal 97 also turns the rejustify switch 38 (FIG. 5) on, but only when switch 200 is closed.

The manual switch 200 (FIG. 1) when open only stops the tape upon creation of a tight line. When the switch is closed reversing and reassemblage will occur on creation of a tight line.

The tight line switch 31 is also connected to the rejustify elevate logic 53 (FIG. 3) to activate or enable this circuit to receive signals from the reassemble pulse generator 54 (FIG. 5) connected to the up/down counter 48 and from the autosetter tape reader 101. The output of the elevate logic circuit causes an unjustified assembly to be elevated.

The rejustify switch 38 is connected to the reversing pulse generator 41 (FIG. 5) of the autosetter for reversing the tape. As the tape is moving in the reverse direction the spaceband, hyphen and long dash codes are sensed by the matrix reader 30 and applied to the up/down counter 48 as described above. Since the tape is moving in reverse the counts will be substracted from the up/down counter 48. When the up/down counter 48 is turned back to zero, the zero count detector 59 produces a signal which is applied to the reassemble pulse generator 54 (FIG. 5) to produce the reassemble signals 94*a*, *b*. This signal from the output of the pulse generator 54 is applied to the rejustify elevate logic 53 (FIG. 3). The logic 53 is activated by the tight line switch 31 and therefore the reassemble signal 94*a* passes through the logic 53 to the elevate OR gate 52. The output of the elevate OR gate 52 triggers the delay circuit 49 whose output applied through the elevate circuit 51 is the elevate signal 107*a* for activating the line-casting machine to clear the unjustifiable assemblage from the assembly carriage. The reassemble signal 94*a* applied to the elevate OR gate 52 produces the same results as the justify signal 90 when it is applied to the elevate OR gate 52.

The rejustify elevate logic 53 (FIG. 3) is also connected to the autosetter tape reader 101. The autosetter tape reader 101 senses the code indicia on the tape when moving in the reverse direction. If an elevate code is on the tape, it will be sensed and a signal will be applied to the elevate OR gate 53 as was the reassemble signal to elevate and eject the unjustifiable assemblage. An elevate code appears on an unprogrammed tape to indicate the end of a paragraph.

The line-casting mechanism is prevented from casting an unjustifiable assemblage by the pot pump inhibit command 106. The command is generated by the pot pump inhibit switch 39 (FIG. 6). This switch 39 is normally in the OFF condition permitting the line-casting machine to function normally. In the ON condition the switch 39 prevents the line-casting machine from casting a line following elevation. The pot pump inhibit switch 39 is partially activated by the elevate signal 107*b*. Switch 39 is turned on when, with the elevate signal 107*b* and the rejustify signal 92*b* present, a timing pulse 400 (FIG. 6) is received from the line-casting machine telling the pot pump inhibit circuit which line to not cast. Without this timing pulse it is possible to turn switch 39 on for the wrong line.

The rejustify switch signals 92*a*, *b* are present immediately following the determination that a line has failed to justify. The elevate signals 107*a*, *b* are generated when the tape is reversed to the beginning of a line. The reassemble signal 94*a* is applied to the elevate OR gate 52 through the rejustify elevate logic circuit 53. The pot pump inhibit switch 39 is turned off when the rejustify switch 38 changes from the ON to OFF condition. This occurs following the justification of a line when the justify signal 90 is applied to the OFF input of the rejustify switch 38.

The rejustify switch 38 is also connected to the rail and shift transfer switch 62 through the transfer OR gate 50. The transfer switch 62 first applies a signal to the rail OR gate 63 and then after a short delay applies a signal to the shift OR gate 64. The application of the switch signal to the two OR gates 63 and 64 allows the information in the rail and shift memories 60, 61 to be transferred to the autosetter, separately. Reassembly of the rejected line will then be begun with the rail and shift switches 116, 117 of the autosetter in the same condition at the start of the rejected line. During transfer of the rail and shift information, the rail and shift signals 112, 111 are also applied through OR gate 65 to the decoder inhibit logic 66 to generate the decoder inhibit signal 110. The decoder inhibit output 110 is needed to prevent a matrix from being inadvertently requested during the transfer. The rail and shift commands are requests for machine operations and not for a matrix and are not inhibited by the signal from the decoder inhibit logic 110.

The reassemble signal 94*a*, *b*, which causes the elevate command 107 to be generated and applied to the line-casting machine, simultaneously stops the reverse movement of the tape by generating the OUT-OF-REV command 113. The reassemble signals 94*a*, *b* are generated when the up/down counter 48 is counted down to zero. This indicates the beginning of the line to be reassembled. The reassemble signal 94*b* turns the reverse switch 56 on through reverse OR gate 55. The output of the switch 56 is applied to the tape direction circuits of the autosetter through an OR gate 58. The output of the reverse switch 56 is fed back to the reverse switch 56 through OR gate 58*a* and turns the switch off when the tape forward signal F is applied. The tape will not start forward until the elevate signal 107*a* is applied to the tape stop switch 35 thereby returning control of the tape to the autosetter.

A manual reverse circuit 57 is available when the autojustifier is not in operation. The operator controls the direction of tape movement. When the tape is reversing the operator can request that each spaceband, hyphen and long dash detected by the matrix reader 30 cause the tape to automatically stop its reverse movement. This capability allows the operator to reverse a tape a word at a time.

The rejustify switch 38 remains on throughout the reassembly of a line. The rejustify switch signal 92*a* is used to activate the thin space OR gate 43. The signal F indicating that the tape is moving forward is also necessary to activate the thin space AND gate 43. The spaceband signal 91 of the matrix reader 30 is the remaining input to the thin space OR gate 43. The thin space OR gate 43 is in turn connected to a pulse generator 42 whose output 104 causes a thin space matrix to be dropped from the line-casting machine magazine. Thus for each spaceband read from the tape during reassembly a thin space will be inserted into the line along with the spaceband. This expands the space between the words, thereby imparting a different length to the line. This length may justify. If the reassembled matrices are justifiable, the elevation signal 107*a* is generated and the assemblage is elevated for casting. The justify signal 90 from the justify signal means turns the rejustify switch 38 off completing the rejustification operation. The autojustifier and autosetter then proceed to assemble the next line of matrices.

If the reassembled matrices fail to justify, the rejustify signal 97 is ineffective except to stop the tape since the rejustify switch 38 will already be on. As previously described the rejustify switch 38 only actuates the reverse tape pulse generator 41 when it is turned from off to on. Since the tape is not reversed, no signal is produced by the justify elevate logic 53 to jog and elevate the assemblage. All operations stop and the matrices are manually justified and elevated.

The tape has codes for turning the indentation circuit on and off. The space between these codes may span many lines. Thus each line will be automatically indented as they are assembled between these codes. The amount of indentation is manually set by the indentation setting means. This adjustment is preferably made when the autojustifier and autosetter are set up for processing a tape. The indentation reader 67 senses the indentation START and STOP codes and turns the indentation switch 68 on and off. The output of the switch 68 applies an ON signal to the initiating indentation OR gate 69 rendering the gate receptive to the autoclear signal 115 produced by the elevated assemblage. The autoclear signal 115 causes the automatic indentation of each succeeding line of matrices. Indention of succeeding lines occurs until the indentation reader 67 senses a code turning indentation switch 68 off.

The autoclear signal 115 applied through OR gate 69 turns the second indentation switch 70 on. The step function output of this switch 70, resulting from its being turned on, is applied to the tape control switch 35 through the OR gate 36 to turn the switch 35 on. This stops the tape while the indention matrices are assembled. The output of the second indentation switch 70 is also connected to the pulse generator 71 and the counter 73. The AND gate 74 is partially activated by indention switch 68. The pulse generator 71 issues indentation command 109 to the line-casting machine and continues to place indentation matrices in the assemblage until the second indention switch 70 is turned off. The continuous signals being issued by the pulse generator 71 are counted by the counter 73. The number of indentation commands counted is matched by the comparator 72 with the setting on an external dial 114. When the numbers in the counter 73 and on the external dial 114 are equal the comparator 72 generates a signal which turns the second indentation switch 70 off. This change in the switch 70 resets the counter 73 to zero and turns the tape switch 35 off. The autosetter then starts the tape forward and the remainder of the line is assembled. On elevation of an assemblage the autoclear signal 115 will again turn the second indentation switch 70 on and similar indentation will be made in the succeeding line. This operation repeats for each line until the indentation reader 67 detects a stop code on the tape and turns the indentation switch 68 off. The succeeding line will not be indented.

DETAILED DESCRIPTION

The autosetter and the line-casting machine which are of conventional type are not shown. The autojustifier is connected to the line-casting machine through the autosetter to receive and impart signals and commands. The justified region end switch 100 and the justified region entry switch 102 are mounted on the line-casting machine and provide signals through the autosetter to indicate the end of the assemblage of matrices and the entry of the assemblage into the justification zone. The tape reader 101 is in the autosetter and reads the coded tape to provide signals to the autojustifier. The operation of the tape in the autosetter is responsive to a tape control in the autosetter which stops and starts the tape in response to the tape stop signal 103 and to the reverse tape signal 105. Also not shown is the switch on the line-casting machine which is actuated by the elevation mechanism to provide the autoclear signal, A/C No. 1, 115 to indicate that the line-casting machine is in condition to receive the next assemblage of matrices.

FIGS. 2–11 are the drawings of the apparatus with the signals set forth so that a signal with a dot preceding the reference numeral or name is present when it is positive and is not present when it is negative. A signal with a dot following the reference numeral or name is the complement of a signal with a dot preceding the reference numeral or name and is present when negative and not present when positive. In the drawings the signals are in some instances also illustrated to indicate the length of the signal and its polarity. The length except when otherwise stated is in milliseconds.

MATRIX READER—30

Figure 5:
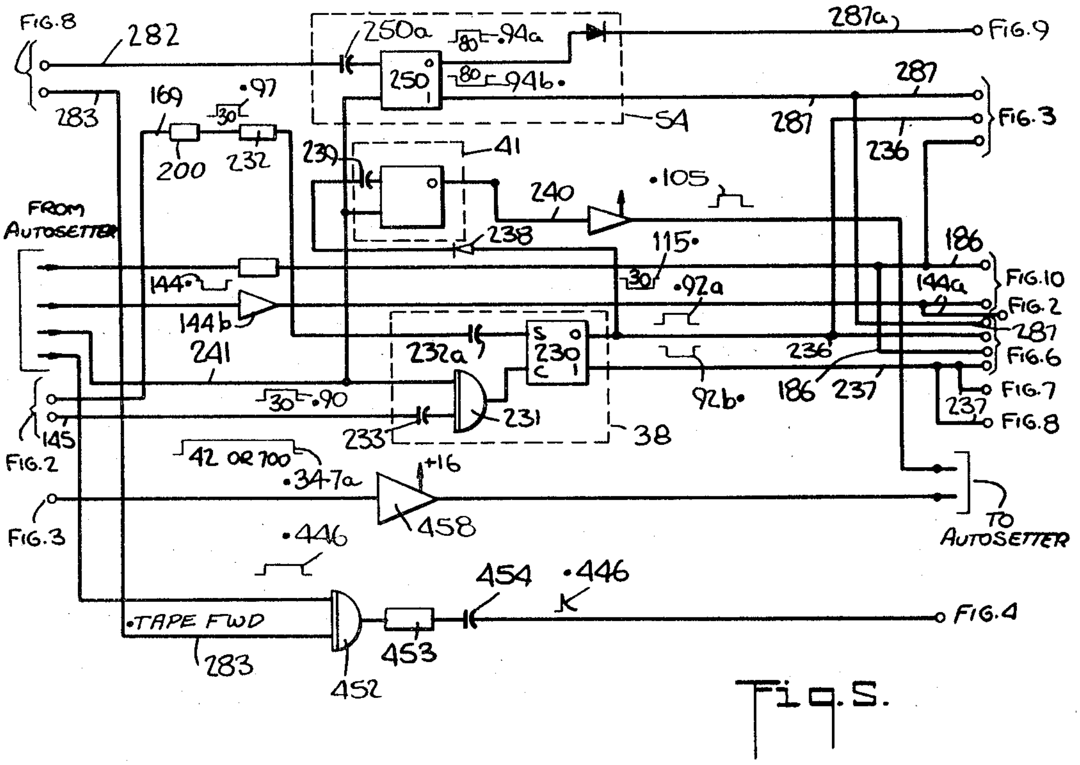
FIG. 5 is a detailed electrical diagram of the reassemble pulse generator, reverse pulse generator and rejustify switch components.

The matrix reader 30 (FIG. 2) consists of a hyphen OR gate 131, a long dash OR gate 132 and a spaceband OR gate 133. The inputs 131*a*, 132*a* and 133*a* of these OR gates are connected to the autosetter tape reader 101, and the outputs of the OR gates produce the hyphen signal 98*a*, long dash signal 98*b* and spaceband signal 91 when corresponding commands are sensed on the tape. The hyphen and long dash outputs of gates 131 and 132 are connected to the AND gate 134 to produce the hyphen/long dash signal 98*d* through the inverter 134*a*. These four signals from the matrix reader are used throughout the circuit by means of the lines 135, 136, 137 and 138. The outputs of lines 135 and 136 are present when the signal on the line is negative. The outputs of lines 137 and 138 are positive. The matrix reader 30 is connected to output lines 135 and 136 through the hyphen/long dash circuit 30*a*. A timing signal 181 is provided from the autosetter through the timing control 180, shown in FIG. 4, over line 182 to the input of the OR gates 131, 132 and 133. This signal delays or inhibits the gates until the memory flip-flops in the autosetter are stable. The shift signal 157 and the unshift signal 158 are applied by lines 163 and 164 to the inputs of the OR gates 131 and 132, respectively. These signals are present at gates 131 and 132 as a precaution against the wrong command being processed. In FIGS. 4 and 5 RCC signals 144, 446, 443, 448 are provided from the autosetter in response to codes on the tape.

TIMING CIRCUITS

The timing control circuit 180 (FIG. 4) comprises the bistable flip-flop 440 and two input OR gates 441, 442. The gate 441 passes the leading edge of the RCC signal 443 through the capacitor 445 to set the flip-flop when the tape is moving forward. The trailing edge of the RCC signal 446 sets the flip-flop 440 on the tape moving in reverse by the first RCC code read in reverse. The RCC signal is created by a code on the tape intermediately positioned between the matrix codes for providing a timing signal to the autojustifier for activating various components to render them responsive to the tape codes.

The flip-flap 440 is set by the RCC leading edge for all other RCC codes while the tape is reversing. The line 447 is connected to the autosetter and provides a set pulse 448 through the inverter 449 and capacitor 450. The set pulse 448 is generated by the autosetter on every line and clears the flip-flop 440. The RCC signal 446 is provided through the OR gate 452, inverter 453 and capacitor 454 from the autosetter (FIG. 5). The tape forward signal from line 283 of FIG. 8 provides a clamp in the forward direction to prevent the creating of a trailing edge signal if the tape is running in the forward direction.

Figure 7:
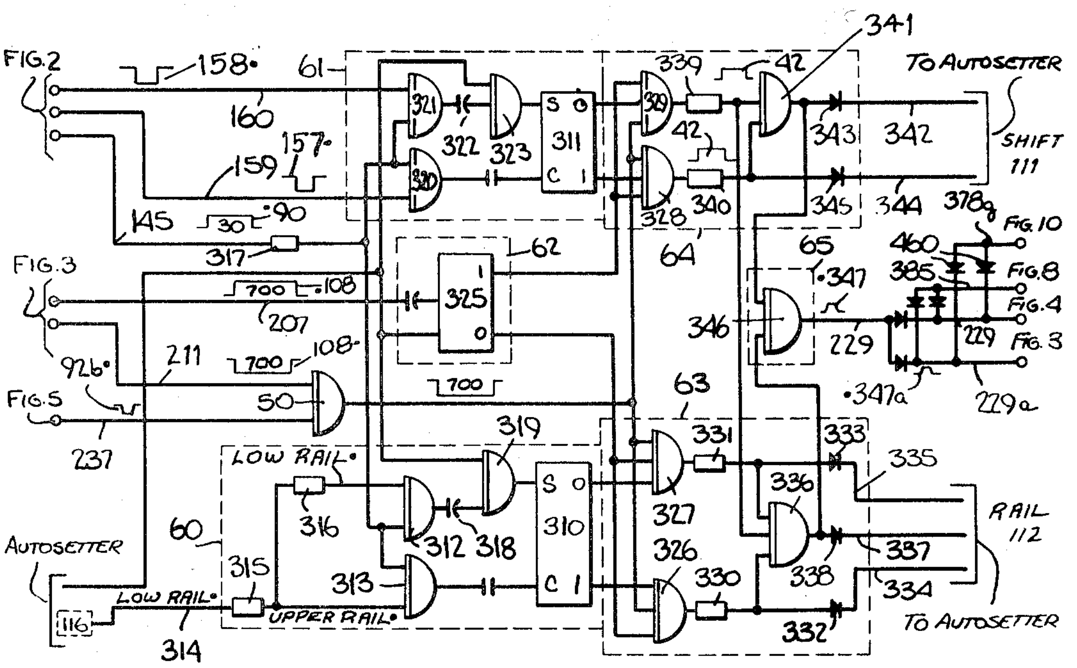
FIG. 7 is a detailed electrical diagram of the rail and shift memory and transfer components.

As later described herein in connection with the rail and shift memory circuits, the OR gate 65 applies the rail and shift signals 112, 111 to the decoder inhibit logic 66. This is applied by line 229 (FIG. 7) as signal 347 to the OR gate 225 in the decoder inhibit logic circuit (FIG. 4). As illustrated in FIG. 7, line 229*a* provides a simulated RCC signal 347*a*. This is supplied to the autosetter through an OR gate 455 and inverters 456, 457 (FIG. 3), and amplifier 458 (FIG. 5) to the autosetter. In addition to the line 229*a* the OR gate 455 has an input connected to the line 219 in the output of the pulse generator to receive the simulated elevate signal 215. The simulated RCC signal 347*a* is passed to the autosetter. This signal is needed when a simulated command is sent to the autosetter because the tape is not moving and hence no actual RCC signal exists.

JUSTIFIED REGION SWITCH—33

The justified region switch 33 (FIG. 2) consists of a bistable flip-flop 146 and an AND gate 147. The output of the AND gate is the justified region enable signal 148. When the justified region switch 102 on the line-casting machine closes, a justification signal 150 is applied to the AND gate 147 activating one-half of the gate and is applied to the zero side of the flip-flop 146 through the diode 146*c* and capacitor 146*d* causing its zero side to become negative. The zero side of the flip-flop is set positive by the leading edge of the very next RCC enable timing pulse 144. The RCC enable circuit is provided over line 144*a* which is connected to the autosetter through the amplifier 144*b* (FIG. 5). The AND gate 147 generates an output when the two inputs are positive. The justification signal 150 is positive and immediately activates one-half of the AND gate. The other input will be positive after the first RCC enable pulse 144 is applied to the flip-flop 146 through the inverter 146*a* and capacitor 146*b*. The output of the AND gate is immediately inverted by the circuit 151 to produce the negative justified region enable signal 148.

JUSTIFIED SIGNAL MEANS—34

The justiled signal means 34 (FIG. 2) consists of three OR gates 140, 141 and 142 and one AND gate 143 with an inverter 143*a*. The justify signal 90 is impressed on the line 145 by the output of the OR gate 143. The inputs of the three OR gates are respectively connected to the outputs of the hyphen, long dash and spaceband gates 131, 132 and 133. The output of the justified region switch 33 is also connected to the OR gates 140, 141 and 142 as well as the line 144*a* carrying the RCC enable signal 144. When the justified region is entered the three OR gates 140, 141 and 142 are activated by a justified region enable signal 148 indicating that the assemblage is in the justified region. The leading edge of the following RCC enable signal 144 times the activation of the OR gates. The justify signal 90 is generated when any of the three activated OR gates detects a signal from the matrix reader 30. The input and output signals to the OR gates have negative potentials.

The hyphen/long dash circuit 30*a* has two OR gates 170 and 171 to receive the hyphen signal 98*a* and the long dash signal 98*b*, respectively. These OR gates will pass the respective signals when activated by the justified region enable signal 148 and the RCC enable signal 144 connected to the inputs of the AND gates. The long dash and the hyphen signals 98*a*, 98*b* on lines 135 and 136, respectively, are negative.

SHIFT AND UNSHIFT CIRCUIT—152

Figure 2:
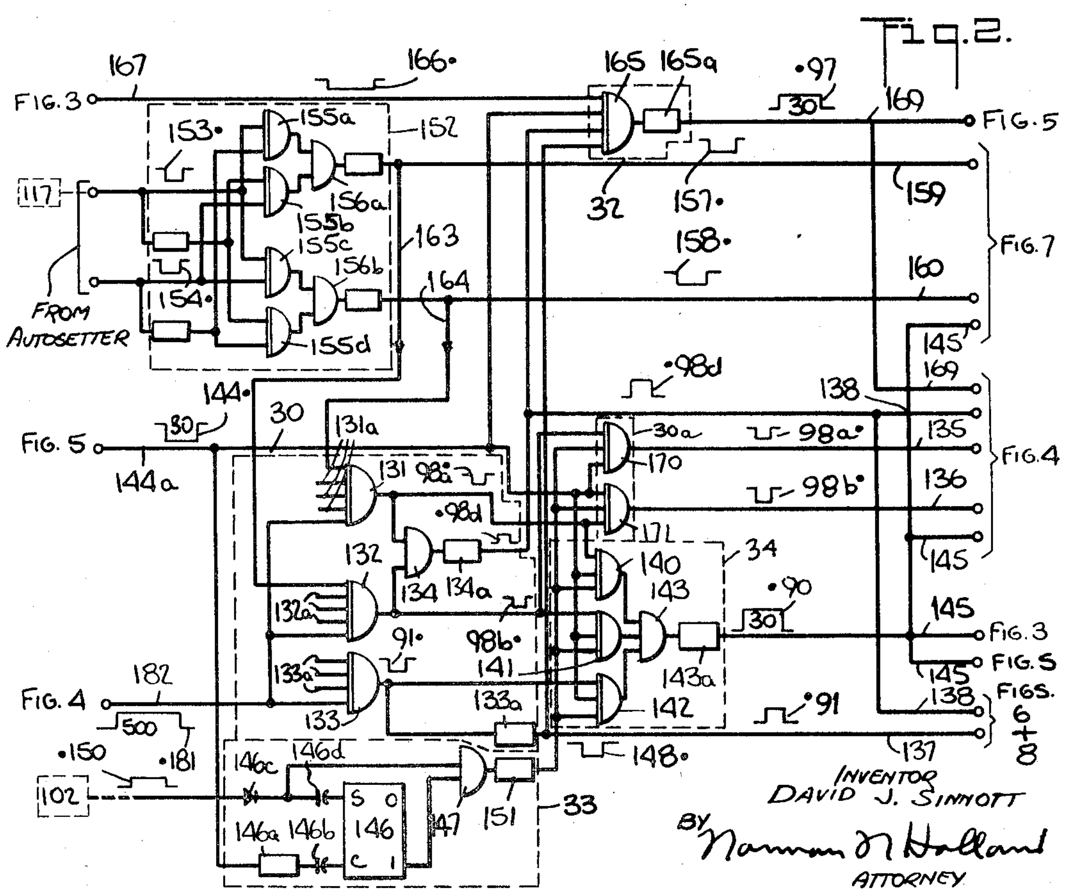
FIG. 2 is a detailed electrical diagram of the components producing the justifying, rejustifying, shift, long dash, hyphen and spaceband signals.

Also shown in FIG. 2 is the shift reader 152 which is connected to the autosetter to receive the tape shift bar signal 153 and the tape forward bar signal 154. The tape shift signal 153 represents one of two code formats being used by the autosetter and the tape forward signal indicates that the tape is moving in the forward direction. These two signals are presented through the OR gates 155*a*, *b*, *c*, *d* and AND gates 156*a*, *b* to produce the shift signal 157 and the unshift signal 158 in lines 159 and 160, respectively. When the tape shift signal 153 is true, i.e., negative, the circuit permits the shift signal 157 to be produced. When the tape shift signal 153 is false, i.e., positive, the unshift signal 158 is created. The tape forward signal 154 allows signal 153 to generate signal 157. While the tape moves forward when the tape reverses the absence of signal 154 allows signal 153 to produce unshift signal 158. As previously described the shift signal and unshift signal are applied to the OR gates 132 and 131, respectively, over lines 163, 164.

TIGHT LINE SWITCH—31

The tight line enable signal 166 is provided by the tight line switch 31 (FIG. 3) connected to the justified region end switch 100 on the line-casting machine by the line 183. The tight line switch 31 comprises an OR gate 184 and a bistable flip-flop 185. The switch 100 closes when the last matrix of the assemblage on the line-casting machine is reached. This tight line signal is applied to the zero side of the flip-flop 185 turning the switch on and impressing the tight line enable signal 166 on the line 167. The input of the OR gate 184 is connected to line 186 to receive the autoclear signal, A/C No. 1, 115. The signal 115 is created by the autosetter on generation of the elevate cycle and is applied over line 186 (FIG. 5.) This signal turns the bistable flip-flop 185 off to return it to a condition of responsiveness to the next tight line condition. The line 187 connected to the autosetter applies a manual clear signal to the switch 185 through OR gate 184 to turn the switch 185 off when the line-casting machine is initially turned on. Thus a tight line condition is conveyed to the rejustify signal means 32 and the rejustify signal 97 is produced.

REJUSTIFY SIGNAL MEANS—32

The rejustify signal means 32 (FIG. 2) has an OR gate 165 and an inverter 165*a* producing the rejustify signal 97 in line 169. The tight line switch 31 is connected to the OR gate 165 by the line 167 and impresses the tight line enable signal 166 to partially activate the gate. The OR gate 165 is also connected to the RCC line 144*a* to actuate the OR gate 165 if a hyphen, long dash or spaceband is not the last matrix requested. The OR gate 165 is connected to the hyphen/long dash AND gate 134 and the spaceband OR gate 133 through the inverter 133*a*. If a spaceband signal 91 or a hyphen or long dash signal 98*b* is generated by the matrix reader while the tight line enable signal 166 is present, the OR gate 165 is prevented from producing an output. The rejustify signal 97 is generated when the last matrix is placed into the assemblage. If this matrix forms a justified line, the tight line enable signal 166 is prevented from generating the rejustify pulse 97 by the signals 91 and 98*d*. The justify signal 90 is produced instead. If the last matrix does not make a justified line, the rejustify signal 97 is generated at OR gate 165.

TAPE CONTROL SWITCH—35

Figures 9, 10, 11:
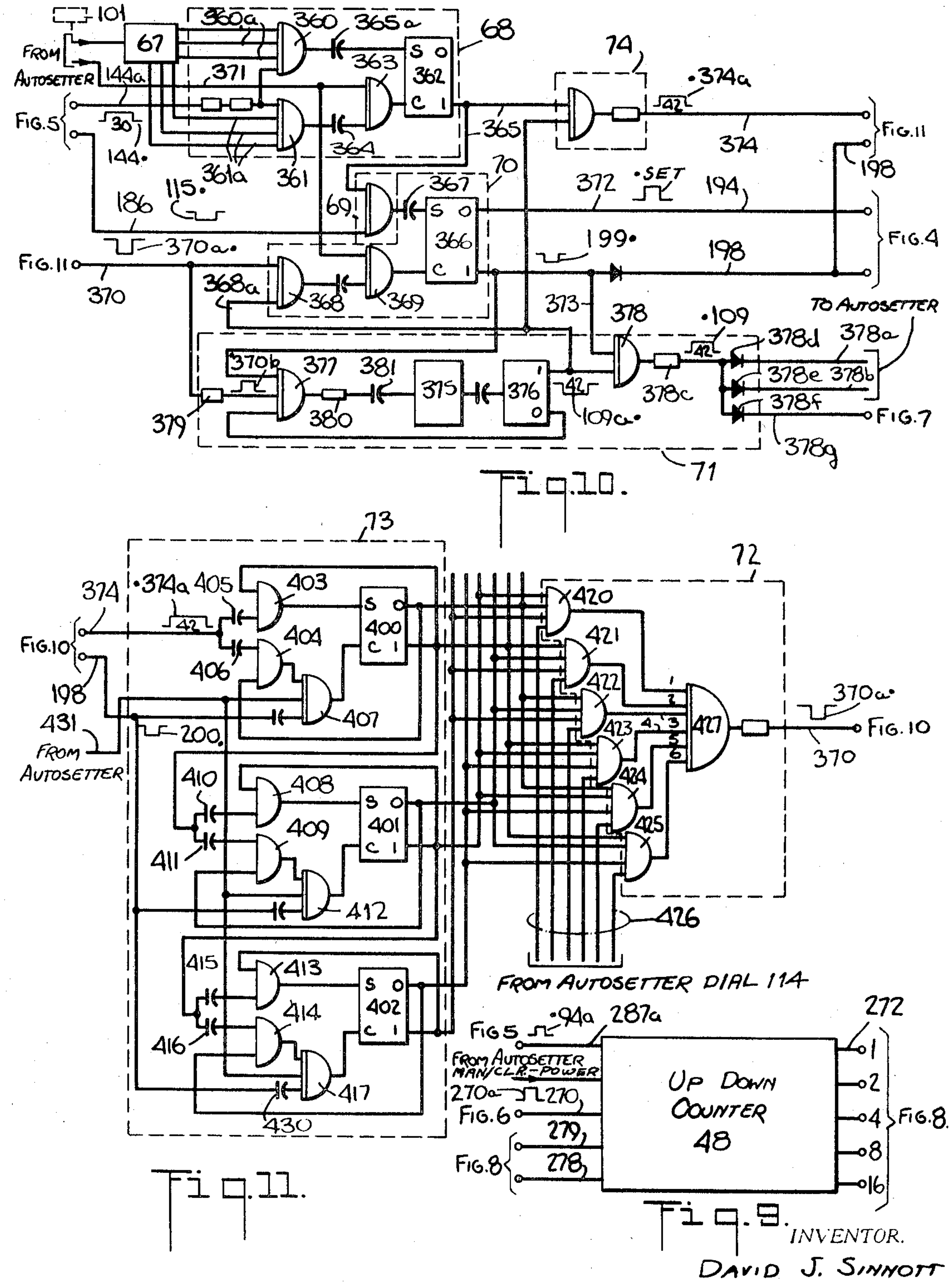
FIG. 9 is a detailed electrical diagram of the up/down counter.
FIG. 10 is a detailed electrical diagram of the automatic indentor control component.
FIG. 11 is a detailed electrical diagram of the automatic indention component.

The tape is stopped by the application of the tape stop signal 103 to the tape control in the autosetter. The tape control switch 35 (FIG. 4) comprises a bistable flip-flop 190 and an OR gate 191. The bistable flip-flop 190 is turned by the OR gate 36 to the ON condition to create the tape stop signal, and the flip-flop is turned off by the OR gate 37. The OR gate 36 has input capacitors 193*a*, *b*, and *c*. The line 194 is connected to the automatic indenter (FIG. 10) to stop the tape during the insertion of blank matrices. The lines 145 and 169 carry the justify and rejustify signals 90 and 97 respectively which stop the tape as soon as either of those signals are generated. The leading edge of the rejustify signal 97 actuates the tape stop. The OR gate 37 has two input capacitors 196*a*, *b*. The line 197 is connected to the delay circuit 49 (FIG. 3) and line 198 is connected to the automatic indenter (FIG. 10). The elevate signal 107*a* on line 197 and the clear signal 198*a* on line 198 from the second indention switch 70 turn the flip-flop 190 to the OFF condition, thereby allowing the autosetter to start the tape running forward when it so decides. The reverse clamp or forward enable signal on line 297 from the autosetter (FIG. 8) will generate a tape stop signal. This signal is applied to the OR gate 191. The line 201 is connected to the autosetter for application of a manual clear signal to establish initial conditions at turn on of the autojustifier.

ELEVATE AND JOG COMMAND CIRCUIT

The justify signal means 34 is connected to the pulse generator 51 through the OR gate 52 and delay circuit 49 illustrated in detail in FIG. 3. The justify line 145 is connected through the capacitor 205 to the OR gate 52. The delay circuit 49 is a monostable multivibrator which produces a jog signal 108 when actuated by the OR gate 52. The signal is applied by line 207 to the rail and shift transfer switch 62 (FIG. 7).

The output of the elevate delay circuit 49 is also connected to the elevate pulse generator 51, the jog AND gate 209 and AND gate 50 (FIG. 7) through inverter 210. The output signal is inverted from positive to negative. The line 211 connects the inverter 210 to the OR gate 50.

The elevate pulse generator 51 consists of flip-flop 214 and monostable multivibrator 213 each producing an output. A capacitor 212 is provided at the input to the multivibrator 213. The multivibrator 213 produces simulated elevate signal 215 on line 219 and triggers the bistable flip-flop 214 through capacitor 216. The multivibrator 213 also creates an autoclear A/C No. 10 signal 107*a*. This signal is applied to the line 197 which is connected to the OR gate 37 in FIG. 4.

The bistable flip-flop 214 produces the elevate command 107 which is applied to the autosetter to elevate the assemblage and also produces the elevate signal 107*b* applied to the pot pump inhibit OR gate 40 by line 217. The line 217 receives the justification signal 150 through the blocking rectifier 218 and inverter 218*a*. This signal 150 is a clamp preventing the elevate enable signal from becoming negative except when in the justified region.

The input of the jog AND gate 209 is connected to the autosetter through the OR gate 209*a* to receive the jog signal when an elevate code is read from the tape and is also connected to the output of the elevate delay circuit through inverter 210 to produce a jog command on justification. The reverse tape decoder inhibit is impressed on the OR gate 209*a* to prevent the generation of a jog command by an elevate code on the tape when the tape is in reverse. The jog command is applied to the line-casting machine through the autosetter shortly before the elevate command is generated.

The bistable flip-flop 214 has the input connected to the A/C No. 1 signal 115 on line 186 to receive the signal through capacitor 220 and OR gate 221 for returning the flip-flop to the initial state. The OR gate 221 is also connected to line 187 by line 187*a* to receive the manual clear signal from the autosetter. This manual clear signal is also applied over line 187*a* to the elevate pulse generator 51 and the monostable multivibrator 213.

DECODER INHIBIT LOGIC CIRCUIT

The decoder inhibit logic 66 is illustrated in FIG. 4 and its purpose is to prevent a spaceband matrix selected by the code on the tape from being the last matrix in an assemblage. The circuit comprises an OR gate 225, an OR gate 226 and an AND gate 227. The inputs to the AND gate 227 must be positive to produce the decoder inhibit command 110. The long dash signal 98*b* and the hyphen signal 98*a* on lines 135 and 136 respectively are applied to the input of the AND gate 227. The outputs of the OR gate 225 and OR gate 226 are connected to the AND gate 227. The long dash and hyphen signals are normally positive, i.e. not present, but will prevent the creation of the command 110 if a long dash or hyphen is the last matrix requested by the tape at which time they become negative. The output of the OR gate 225 is positive when activated by a justify signal 90 on line 145, simulate elevate signal 215 on line 219 or the signal 347 as a rail and shift inhibit from the rail shift OR gate 65 (FIG. 7) applied on line 229. Either signal may generate a decoder inhibit. The rectifiers 460 are blocking rectifiers. The OR gate 226 is activated by the hyphen/long dash clamp signal 98*d* on line 138 and the justification signal 150 over line 201 from the justified region entry switch 102.

Thus the decoder inhibit signal 110 is generated and passed to the autosetter through the inverter 227*b* to prevent the insertion of a spaceband as the last matrix.

If, after the justify signal 90 is applied and before elevate signal 215 is applied, the justification signal 150 is removed after jogging, a spaceband decoder inhibit 110 will not be generated when the elevate signal is applied. This is true only if the hyphen/long dash signal 98*d* is not present, i.e. justification is by spaceband. The spaceband is dropped before continuing with the assembling of the line.

The spaceband is permitted by OR gate 226. The output of this gate is positive while in the justified region since signals 150 and 98*b* are both positive. Signal 150 merely indicates that assembly is in the justified region and 98*b* is positive indicating that neither a hyphen nor long dash have been selected.

The output of the OR gate 226 will go negative only if signal 150 is lost, thereby indicating the opening of the justified region entry switch following a jog. This negative output inhibits AND gate 227 from generating decoder inhibit thus allowing the spaceband to fall.

REJUSTIFY SWITCH—38

The rejustify switch 38 (FIG. 5) comprises a bistable flip-flop 230, one side of which is normally one set, i.e. positive. The zero side of the flip-flop is set by the leading edge of the rejustify signal 97 on line 169. This places the rejustify switch in the ON condition. The flip-flop is reset to the OFF condition by the OR gate 231. The line 145 of FIG. 2 is connected to the input of the gate 231 through the capacitor 233 to impress the leading edge of the justify signal 90 on the OR gate 231 and turn the rejustify switch off. This occurs when the reassembled matrices justify. Switch 200 previously described is located in line 169.

The flip-flop 230 is turned on by applying the rejustifying signal 97 from the line 169 through the inverter 232 and capacitor 232*a*. Rejustify switch signals 92*a*, 92*b* are impressed on lines 236, 237 respectively indicating a tight line condition.

The signal 92*a* is impressed on the reverse pulse generator 41 (FIG. 5) through rectifier 238 and capacitor 239. The reverse pulse generator 41 is a monostable multivibrator. The reverse tape signal 105 is applied to the tape control in the autosetter over line 240 to put the autosetter in the reverse mode.

The manual clear line 241 from the autosetter is connected to the reverse pulse generator 41 and the OR gate 231 of the rejustify switch to reset these components. This reverses the tape on the autosetter for returning to the beginning of the assembled line.

WORD AND SYLLABLE COUNTER

The up/down counter 48 (FIG. 9) used to record the number of spacebands, hyphens and long dashes requested during the assembly of a line is a standard five bit binary counter. The number being recorded at any particular instant is determined by the state of the five output lines 272, each of which represents one of the five binary bits. When all the output lines are negative, the counter is at the number zero. When the five output lines are positive, it is holding its maximum count which is the decimal number thirty one. The counter will return to zero if one more count is added. Likewise, when the counter is at zero, if one count is subtracted, the count becomes thirty one.

The counter is initially set to a count of 1 (one) by a manual clear or power ON signal from the autosetter. During operation the counter is set to a count of one each time a justified line of type is elevated and cast. This is accomplished by the autoclear A/C No. 2 signal applied to the counter.

The autoclear A/C No. 2 signal 270*a* supplied from the OR gate 44 (FIG. 6) is produced by the rejustify switch signal 92*a* on line 236 and autoclear A/C No. 1 signal 115 over line 186 from the autosetter. The input signals are present until a rejustify signal 92*a* and reverse inhibit signals from line 284 are applied. Thus the counter 48 cannot be cleared when an unjustified assembly exists or the tape is in reverse. The autoclear signal 115 is created on elevation. Thus the counter 48 is cleared to a count of one by signal 115 on elevation of an assembly. The signal 115 may be produced by a manual out of reverse signal from the autosetter.

While the tape is moving forward a count of one is entered into the counter via the count up input line 279 from the OR gate 46 (FIG. 8). Each count up pulse received causes the number being held in the counter to increase by one. The count down signal via the line 278 from the OR gate 47 (FIG. 8) causes the counter to reduce the number it is holding by one. The line 287*a* is connected to the pulse generator 54 to receive the reassemble signal 94*a* to clear the counter 48 on a zero count. The counter input control pulse generator 45 (FIG. 8) is connected to the lines 137 and 138 bearing signals 91 and 98*d* and to line 275 with enter-a-count signal 275*a*.

The monostable multivibrator 247 is triggered by the OR gate 276 with the capacitor 276*a* in line 275 impressing the first or initial count by enter-a-count signal 275*a*. The signal 275*a* is generated by the reverse switch 56 (FIG. 6). The output of OR gate 277 is connected to the OR gate 276 through capacitor 276*b*. The spaceband and hyphen/long dash signals count the words and trigger the count pulse generator through the gates 276 and 277. This counting occurs whether the tape is moving forward or in reverse. The output of the pulse generator 45 is connected to the subtract OR gate 47 and the add OR gate 46. The OR gate 47 is suppressed by the tape forward signal from the autosetter through inverter 248 in line 283 and the OR gate 46 is suppressed by the tape reverse signal from the autosetter through the inverter 249. Thus the gate 47 passes the reverse or subtracting count and the gate 46 passes the forward or count up signals over lines 278, 279 respectively.

The zero count detector 59 has an input OR gate 280 which produces a zero count signal 281 on line 282 when the number in the up/down counter is zero. The five input lines 272 carry positive signals representing the numbers held by the up/down counter. These positive signals prevent the zero count signal 281 from being produced. The tape forward signal from the autosetter is applied to the OR gate 280 from line 283 to inhibit the gate from producing the zero signal when the tape is moving forward. The counter inhibit signal applied from the reverse switch 56 (FIG. 6) over line 284 prevents zero count signal from being produced when the tape is being manually reversed and the reverse signal R or 240*a* is provided over line 240 (FIG. 6). The zero count is needed only during automatic reversing. The output of OR gate 277 is also connected to the OR gate 280 to inhibit the zero count detector and the OR gate 280 for a sufficient period to allow the outputs of the up/down counter to stabilize. The justified inhibit signal 285*a* applied over line 285 and produced by a switch setting on the control panel of the autosetter prevents a zero count signal when a programmed tape is used.

The zero count signal produced by the gate 280 is applied to the reassemble pulse generator 54 (FIG. 5) through capacitor 250*a*. This generator has a monostable multivibrator 250 which produces the reassemble signals 94*a, b*. The signal 94*b* is applied to the elevate logic circuit 53 over the line 287. The multivibrator is triggered by the zero count signal which indicates that the beginning of a rejected line has been reached. The signal 94*a* is applied to the up/down counter over line 287*a* and to the AND gate 55 (FIG. 5).

REVERSE TAPE CIRCUIT

The reassemble signal 94*b* is applied through the OR gate 55 (FIG. 6) along with the reverse enable signal 240*a* generated by the autosetter on line 240*b* to set the reverse switch 56. The OR gate 55 has an inverter 55*a* and capacitor 55*b* connecting it to the reverse switch 56. The reverse switch comprises a flip-flop 290. The zero side being positive or one set represents the ON condition of the switch. The zero side output is applied to the autosetter through the OR gate 58 (FIG. 6) and to the OR gate 44 from line 284 as a reverse inhibit and to the counter components 46, 47, 59 (FIG. 8) as a counter inhibit. These inhibit signals prevent the counter components 46, 47, 59 from operating. The reverse inhibit to gate 44 (FIG. 6) does not exist until the tape has been reversed beyond the beginning of the line. The input of the gate 44 connected to line 236 has a signal as long as no tight line exists and the reverse switch signal 92*a* is not applied. The autoclear No. 1 signal 115 on line 186 provides the timing of the end of the assemblage and elevation causing A/C No. 2 to be generated and the counter set to one.

The OR gate 58 comprises an input OR gate 291 and an output OR gate 292. The OR gate 292 produces the out-of-reverse signal 113 which when applied to the tape control of the autosetter over line 293 causes the reversing tape to stop. The OR gate 55 is partially activated by the tape reverse signal R or 240*a* from the autosetter over line 240*b* indicating the tape is moving in reverse. The signal 94*b* on line 287 turns flip-flop 290 on.

The justified clamp is applied from the autosetter to the OR gate 291 over line 294 to render the gate 291 operative when the autojustifier is not being used. The flip-flop 290 is automatically reset by feeding the out-of-reverse signal 113 over line 295 to the OR gate 296 of the component 58*a*. The resetting of the switch does not occur until the tape is again moving forward. The forward enable signal is impressed over line 297 (FIG. 8) from the autosetter on the OR gate 296 indicating that the tape is moving forward. The out-of-reverse is already present at gate 296 so that it will generate an output resetting flip-flop 290. The output of the OR gate 296 is applied through capacitor 298 to the OR gate 299 through which the manual clear from the autosetter is applied to the flip-flop 290.

The manual reverse 57 (FIG. 6) comprises AND gates 300 and 301 which are partially activated by the word/word enable signal applied by line 302. This signal is generated by a manual switch in the autojustifier. A tape forward clamp signal is applied by line 283 (FIG. 8) and exists only in the forward direction and is used to simulate the word/word enable if the word/word switch in the autojustifier is in the elevate position. The rectifiers 304, 305 block the signals because of the common connection. The spaceband and hyphen/long dash signals are applied over lines 137 and 138 from the matrix reader. The operator may reverse the tape word by word when using the autosetter manual control. The justified clamp is provided from line 294 throught the inverter 306 to the AND gates and prevents the output of the manual reverse switch 57 from generating the out-of-reverse signal on the line 293. The AND gates 300 and 301 are connected to the OR gate 58 through the OR gate 307.

A tape elevate signal is applied from the autosetter through inverter 308 in line 308*a* and rectifier 309 to create an out-of-reverse signal in the line 293. The elevate signal is produced from an elevate code on the tape and would indicate that the end of a paragraph had been reached.

RAIL AND SHIFT MEMORY CIRCUITS

The rail switch 116 (FIG. 7) and shift switch 117 (FIG. 2) are in the autosetter and control the line-casting machine. The shift 117 is connected through the shift reader 152 in FIG. 2 by lines 159, 160. These signals are applied to the autojustifier for memorizing the condition of the line-casting rail and shift switches at the commencement of a line to be assembled. The rail and shift memory circuits are identical and comprise flip-flops 310, 311 (FIG. 7). The input OR gates 312, 313 are connected to the lower rail line 314 from the autosetter through the inverter 315 to form the upper rail signal impressed on gate 313. The inverter 316 reforms the lower rail signal for impression on the gate 312. The justify signal 90 on line 145 is applied through inverter 317 to both gates. This signal permits the rail condition to be memorized at the completion of a justified line. The lower rail gate is connected through capacitor 318 and OR gate 319 for application of the manual clear from the autosetter. When the zero side of the flip-flop 310 is negative, the memory records upper rail condition. When the one side of the flip-flop is negative, the memory records lower rail condition.

The shift memory circuit 61 has input OR gates 320, 321 connected to lines 159, 160 respectively for shift and unshift signals, and to line 145 for the justfy signal 90. This latter signal permits the recording of the memory. The unshift gate 321 is connected to the flip-flop 311 through capacitor 322 and the OR gate 323 in order to receive the manual clear.

The shift signal is represented by the zero side of the flip-flop 311 of zero set or negative. The unshift signal is represented by the one side of the flip-flop if zero set. The flip-flop 311 therefore records the condition of the shift switch 117 (FIG. 2) in the autosetter when the justify signal activates the input OR gates 320 and 321.

The rail and shift transfer switch 62 comprises a monostable multivibrator 325. The zero side of this monostable multivibrator is normally negative. The leading edge of the jog signal 108 on line 207 (FIG. 3) triggers the multivibrator and a positive pulse is generated at the zero side. The signal 108 is produced simultaneously with the elevate command 107 by the elevate delay circuit 49 (FIG. 3). The outputs of the flip-flops 310 and 311 are impressed upon the rail OR gate 63 and the shift OR gate 64, respectively. The rail AND gates have input lower and upper OR gates 326, 327 and the shift AND gates have unshift and shift AND gates 328, 329 respectively which are connected as just described. The rail OR gates 63 has inverters 330 and 331 connected in the outputs of the lower and upper gates 326 and 327. These outputs are connected through rectifiers 332 and 333 to lines 334, 335. The outputs are also connected to an OR gate 336 which is connected to the line 337 through a rectifier 338. The input of the OR gate 336 is also connected to the inverter 339 in the output of the shift gate 329. Either gate 326 or 327 is activated to indicate an upper or lower rail condition and activated by the OR gate 50. The OR gate 50 produces an output when a rejustify condition exists as indicated by the rejustify switch signal 92*b* applied on line 237 from the rejustifying switch 38. The zero side of the multivibrator 325 must produce a negative signal in order for the input gates 326 and 327 to be activated. The input gates will then be in condition to receive either an upper or lower rail signal from the bistable multivibrator 310. The upper rail command is sent over lines 335 and 337 and the lower rail command is sent over lines 334 and 337. The OR gate 336 generates an output when either of the input gates 326 or 327 operates and thus provides a signal in either instance to be combined either with the signal line 335 or 337.

Shift and unshift OR gate 64 has inverters 339 and 340 in the outputs of the input gates. An OR gate 341 is connected to both input gates and is connected to the shift output line 342 through the rectifier 343. The input gate 328 is connected to the output line 344 through the inverter 340 and rectifier 345. Thus the shift signal appears on line 342 and the unshift on 344 which are connected to the autosetter. The input gates are connected to the zero and one side of the multivibrator 311 and transmit the signal in the memory multivibrator depending on which side of the multivibrator is negative. The input gates 326 and 327 and the input gates 328, 329 must be similarly activated in order to pass the memory information. The input gates 328 and 329 are connected to the one side of the multivibrator 325 and the input gates 326, 327 are connected to the zero side. The one side is normally positive but becomes negative when the switch 62 is triggered to permit the shift transfer information to be passed to the line-casting machine first. When the one side becomes positive following the transfer of the shift information, the signal then comprises the activation of the input gates 326 and 327 and the gate which receives the negative signal from the multivibrator 311 will have an output to form either the upper or lower rail signal.

The OR gate 346 is connected to the output of the OR gate 341 and to the output of the OR gate 336. The output of the OR gate 336 activates the gate 346 whether an upper or lower rail signal is produced. The shift signal, therefore, creates a decoder inhibit signal 347 in line 229 to prevent the autosetter from inadvertently requesting a matrix while the shift and rail commands are being executed and to provide a simulated RCC signal 347*a* in line 229*a*.

REJUSTIFY ELEVATE LOGIC CIRCUIT—53

The rejustify elevate logic 53 shown in FIG. 3 comprises input OR gates 350 and 351, each connected to the line 236 of FIG. 5 carrying rejustifying switch signal 92*a*. Gate 350 receives the reassamble signal 94*b* on line 287 (FIG. 5) and input gate 351 is connected to the autosetter through inverter 308 (FIG. 6) to receive the coded elevate signal from the tape over line 308*a*. The input gates are connected to the AND gate 353. The output of this AND gate is connected to the elevate OR gate 52 through the inverter 354 and the capacitor 355. The output of the AND gate 353 is generated only for the rejustifying condition, since the rejustify switch signal from 236 activates only one-half of each input gate 350 and 351. The reassemble signal is applied when the tape is reversed to the starting point of the rejected line. The tape elevate signal to the input gate 351 is provided by the autosetter tape reader. Thus in a rejustified condition the rejected assemblage with be elevated either by a commanded on the tape or by the completion of the reversing of the tape. In a justify condition the justify signal 90 is applied over line 142 through capacitor 205 to the OR gate 52 to elevate a justifiable assemblage.

AUTOMATIC INDENTION CIRCUIT

The indentation switch 68 (FIG. 10) has input OR gates 360, 361 connected to the autosetter tape reader 101 (FIG. 1) through the indentation reader 67 by means of line 360*a*, 361*a* for the receipt of indentation commands. The input gate 360 passes the indentation start signal and the input gate 361 passes the indentation stop signal. An RCC enable signal 144 from line 144*a* of FIG. 5 is applied to activate the input start and stop OR gates 360, 361.

The input stop gate 361 is connected to a flip-flop 362 through an OR gate 363 and capacitor 364, and the input OR gate 360 is connected to the flip-flop through the capacitor 365*a*. The flip-flop functions as a switch and when the one side is negative, the switch is ON. When the start code is applied to the input gate 360 the switch is turned on, and when the stop code is applied to the input gate 361 the switch is turned off. Turning the switch on creates a start enable signal in the output lines 365. These lines are connected to the OR gate 69 and to the OR gate 74. The OR gate 69 is also connected to line 186 of FIG. 5 to apply an autoclear, A/C No. 1, signal 115 to inform the indentation circuit that the elevation step in the line-casting machine has been completed.

The output of the OR gate 69 is connected to the flip-flop 366 through the capacitor 367 in the second indentation switch. The flip-flop has its input also connected to the series connected OR gates 368 and 369. The flip-flop 366 is turned on by the OR gates 69 to produce clear signal 200 and is turned off by the OR gates 368 and 369. The OR gate 368 is connected to the pulse generator 71 by line 368*a* to receive a negative enable signal. The enable signal will be positive when the pulse generator is OFF and also during the positive portion of the generator output. The input gate 368 is also connected to line 370 to receive a negative coincidence signal 370*a* when the output of the comparator 72 (FIG. 11) indicates that the proper number of indentation matrices have been placed in the assemblage. The manual clear from the autosetter is applied to the input of the OR gates 363 and 369 by line 371. In the OFF condition one flip-flop provides a set signal over line 194 to the gate 192 and the bistable flip-flop 190 (FIG. 4) to stop the tape during the insertion of blank matrices. On completion the clear signal 200 turns the flip-flop 190 off over line 198.

The decoder inhibit signal provides a decoder inhibit 110 while the indentation matrices are being dropped (FIG. 1). The RCC enable signal 144*a* allows the autosetter to drop indentation matrices (FIG. 10). The indentation pulse generator 71 comprises two monostable multivibrators 375, 376 and an input OR gate 377 and an output OR gate 378. The indentation command 109 is impressed on the output lines 378*a*, *b* through the inverter 378*c* to rectifiers 378*d*, *e*. The output is also impressed through rectifier 378*f* on line 378*g* as an indentation decoder inhibit signal and a simulated RCC enable signal to the lines 229 and 299*a* (FIG. 7) in the output of the OR gate 346. The input gate 377 is connected to the one side of the flip-flop 366 to receive an enable signal which is negative when true. The coincidence line 370 is also connected to the input gate 377 through the inverter 379. The zero side of the output of the multivibrator 376 is connected back to the input of the gate 377 to provide a continuous count signal. The enable signal is negative when flip-flop 366 is turned on. The inhibit coincidence signal 370*b* at the output is negative as long as the coincidence signal 370*a* is positive which means that not enough indentation mats have yet been dropped. The continuous count signal will be negative during the negative half cycle of the pulse generator output. The zero side of the monostable multivibrator 376 is normally negative. The inhibit coincidence signal is normally negative. When all three signals are negative, the input gate 377 produces an output which is impressed on the monostable multivibrator 375 through the inverter 380 and capacitor 381. With three negative inputs the AND gate 377 triggers the monostable multivibrator 375 which in turn triggers the monostable multivibrator 376 through capacitor 375*a*. The multivibrator 376 then produces a negative pulse 109*a* at its one side output. As soon as the zero side of the multivibrator 376 becomes negative, the input gate 377 will again trigger the multivibrator 375 and 376. This closed loop operation results in a continuous train of negative pulses 109*a* being generated at the one side of the multivibrator 376. The output will continue to generate until a coincidence signal is generated. This produces the positive clear signal 199 which is applied over line 373 to inactivate OR gate 378 and block any further indentation commands. The clear signal 200 is applied over line 198 to the counter 73 to clear the counter for another indentation cycle. The output of the multivibrator 376 is applied to the OR gate 74. The OR gate 74 is connected to the counter 73 (FIG. 11) by line 374 and adds a count 374*a* for each indent command 109 generated by gate 378.

The comparator or in coincidence detector 72 and the counter or autoindenter counter 73 are illustrated in detail in FIG. 11. The count pulse passed through the OR gate 74 in line 374 is applied to the counter 73 to accumulate the counts corresponding to each blank matrix inserted. The counter 73 is a three bit binary counter and has three flip-flops 400, 401 and 402. The flip-flop 400 contains the least significant bit and is connected to the line 374 through the AND gates 403 and 404 and the condensers 405, 406. The AND gate 404 is connected to the flip-flop through the OR gate 407. The flip-flop 400 is connected to the flip-flop 401 through the AND gates 408, 409 by means of the capacitors 410 and 411, respectively. The AND gate 409 is connected to the flip-flop 401 through the OR gate 412. Similarly, the flip-flop 401 is connected to the flip-flop 402 through the AND gates 413, 414 by condensers 415 and 416, respectively, and an OR gate 417 is connected between the AND gate 414 and the flip-flop 402. Thus the counts are successively passed to the flip-flops 401 and 402.

The flip-flops 401 and 402 are connected to the AND gates 420–425 of the comparator 72 in the manner as illustrated in FIG. 11. Six lines 426 connect the respective AND gates to the dial 114 in the autosetter which has a range of 1 to 6, thus providing up to six blank matrices for an indentation. When the number of the counter 73 corresponds with the number on the dial setting, one of the AND gates will be activated and the output will be applied to the OR gate 427. The OR gate 427 creates the coincidence signal on line 370 which is applied to the OR gate 368 to shift the flip-flop 366 to produce the positive clear signal 200 which stops the indentation and applies the clear signal to the OR gates 407–417 over the line 198 and through condensers 428 to 430, respectively, for clearing and resetting the counter 73. A manual clear is provided from the autosetter to the OR gates 407, 412 and 417 over line 431.

THIN SPACE COMMAND CIRCUIT

The thin space command circuit (FIG. 8) comprises an OR gate 43 and a monostable multivibrator 42. The gate 43 has four inputs. The primary input is the spaceband signal 91 from line 137 through an inverter 380. Each time a spaceband is read from the tape during reassembly of a line the multivibrator is tirggered through the inverter 381 and capacitor 382 and a thin space command 104 is issued on lines 383 to the autosetter. In the output line 385 a thin space decoder inhibit signal is supplied to the autosetter during the dropping of a thin space matrix to provide a decoder inhibit in the autosetter and to allow the thin space matrices to be dropped. The line 385 is connected to the decoder inhibit logic circuit 66 through the line 229 (FIG. 7) and the output of the OR gate 346. The thin space decoder inhibit signal is also applied to line 229*a* as a simulated RCC enable signal. The gate 43 is activated by the tape forward signal 297*a* or F from the autosetter which is also supplied to gate 58*a* (FIG. 6) by line 297 and a reverse inhibit or clamp 297*a* by line 297 to the tape control switch 35 (FIG. 4). The line 237 impresses the signal 92*b* to indicate that reassembly is occurring. The reverse tape signal 384*a* supplied from the autosetter over line 384 prevents the OR gate from having an output while the tape is reversing.

POT PUMP INHIBIT CIRCUIT

The pot pump inhibit circuit shown in FIG. 6 comprises the AND gate 40 and the pot pump inhibit switch 39. The flip-flop 390 has its zero side output connected to the line-casting machine through the output line 391 to impress the pot pump inhibit command 106 on the machine. This command prevents the line-casting machine from casting a rejected assembly of matrices following elevation. The zero side being one set represents the ON condition of the pot pump inhibit switch. The switch is turned on by the flip-flop 392. The OR gate 393 is connected to the output of the flip-flop 392 and to the zero side input of the flip-flop 390 through inverter 394 and capacitor 394*a*. The machine enable signal is generated by the line-casting machine as a timing pulse. The elevate enable signal 107*b* is applied to line 217 by the pulse generator at the same time as signals 107 and 107*a* are generated. The rejustify switch signal 92*b* on line 237 activates one half of gate 40. This signal is still present when the elevate signal 107*b* is generated. The gate 40 is then fully activated one setting the zero side of flip-flop 392 through the inverter 400 and capacitor 401 and simultaneously zero setting the one side of flip-flop 392. This change of state allows the machine enable to turn flip-flop 390 on.

The flip-flops 390 and 392 are turned off or returned to the initial conditions when the rejustify switch signal is removed. The rejustify switch signal produces a step function when removed which is applied to both flip-flops at the one side inputs thereby resetting the flip-flops. The reassemble signal is turned off when a reassembled line is justified. The OR gates 395 and 396 provide a manual clear from line 397 through capacitors 398 and 399. Signal 400 on line 401 is generated by the line-casting machine. This signal has timing function to cooperate with signal 92*b* to create the command 106 at the proper point in the cycle of the line-casting machine.

As seen from the foregoing general and detailed descriptions an automated apparatus has been developed which is connected to and used with autosetters for operating a line-casting machine from a coded tape on which the lengths of lines have not been determined. The automated apparatus determines whether or not a justifiable assemblage of matrices has been formed by the line-casting machine and automatically rejects an unjustifiable assemblage and attempts to create an assemblage that is justifiable. To accomplish this the apparatus returns the line-casting machine to the settings at the beginning of the assemblage and returns the tape to the first word of the unjustified assemblage.

An auxiliary or additional circuit is provided to automatically indent successive lines when the nature of the composition requires it with the tape only indicating the commencement of the composition being indented and the termination of the composition.

Having thus described my invention, I claim:

1. Apparatus for automatic justification of a set of matrices assembled on a line-casting machine from codes on an unprogrammed tape comprising means for determining the justifiability of a set of matrices assembled from codes on an unprogrammed tape and creating a justify signal on completion of a justifiable assemblage, means connected to said first means to receive a justify signal to interrupt assemblage of matrices, means connected to said justifiability determining means and said assemblage interrupting means for creating a signal to elevate a justifiable assemblage in response to a justify signal and commence assemblage of a succeeding set of matrices.

2. Apparatus for automatic justification as set forth in claim 1 wherein said justifiability determining means has switching means for determining an unjustifiable assemblage and rejustify means being provided and connected to said switching means for actuation on currents of an unjustifiable assemblage and connected to said assemblage interrupting means for preventing the formation of a succeeding assemblage of matrices, said rejustify means including means for reestablishing initial conditions at the commencement of an unjustifiable assemblage, said reestablishing means being connected to said elevate means for creating a signal to elevate an unjustifiable assemblage and commence reassemblage of the matrices.

3. Apparatus for automatic justification as set forth in claim 2 wherein means are provided for altering spacing between groups of matrices of reassembled matrices from spacings of a previous unjustifiable assemblage.

4. Apparatus for automatic justification as set forth in claim 3 wherein said means for altering spacing between groups of matrices increases the spacing between groups.

5. Apparatus for automatic justification as set forth in claim 3 wherein means are provided connected to said elevate means for creating a signal preventing casting of an unjustifiable assemblage.

6. Apparatus for automatic justification as set forth in claim 1 wherein means are provided for automatically indenting successive lines.

7. Apparatus for automatic justification as set forth in claim 1 wherein said elevate means has means for producing a command to jog an assemblage for compacting assembled matrices.

8. Apparatus for automatic justification as set forth in claim 2 wherein said rejustify means includes switch means having two conditions and being shifted by said rejustify means to one condition on occurrence of an unjustifiable assemblage and being connected to said justifiability determining means for return to the other condition on occurrence of a justifiable assemblage.

9. Apparatus for automatic justification as set forth in claim 8 wherein said rejustify means only actuates said switch means to one condition on a single attempt to reassemble a set of matrices.

10. Apparatus for automatic justification as set forth in claim 2 wherein said means for reestablishing initial conditions includes means for memorizing rail and shift conditions at the commencement of an assemblage and means for providing signals of the initial memorized rail and shift conditions on occurrence of an unjustifiable assemblage.

11. Apparatus for automatic justification as set forth in claim 2 wherein said means for reestablishing initial conditions includes means for counting groups of matrices on assemblage and includes means for reversing an unprogrammed tape and counting groups of matrices in reverse for determining when an unprogrammed tape has returned to the beginning of the previous assemblage.

12. Apparatus for automatic justification as set forth in claim 11 wherein means are provided connected to said counting means for creating a signal stopping the reversing of an unprogrammed tape on return to the beginning of the previous assemblage.

13. Apparatus for automatic justification of matrices on a line-casting machine from an unprogrammed tape comprising means for determining justifiability of a set of matrices assembled from an unprogrammed tape and elevating justifiable assemblages for casting and unjustifiable assemblages for noncasting, rejustify means for reestablishing initial conditions at the beginning of an unjustifiable assemblage and commencing reassemblage of the matrices, said rejustify means connected to said justifiability determining means for actuation on determination of an unjustifiable assemblage to reestablish initial conditions and commence reassemblage, means for altering spacing between groups of matrices of reassembled matrices from spacings of the previous unjustifiable assemblage, said justifiability determining means determining justifiability of said reassembled matrices and elevating a justifiable reassemblage for casting.

14. Apparatus for automatic justification of matrices assembled in a line-casting machine from an unprogrammed tape comprising switching means for creating a signal on assembled matrices entering a justification zone, means for receiving signals sensed from a coded tape indicating the addition of matrices terminating in a justifiable assemblage and creating a sensing signal in response thereto, a justify signal means connected to said switching means and said signal sensing means for producing a justify signal on receiving signals therefrom in the justification zone, tape control means connected to said justify signal means to provide a signal to stop an unprogrammed tape on creation of a justify signal, means for creating a command for elevating a justifiable assemblage for casting and connected to said tape control means to impress the elevate command thereon and actuate said tape control means for assemblage of a succeeding set of matrices.

15. Apparatus for automatic justification as set forth in claim 14 wherein said signal sensing means receives signals adding spaceband, hyphen and long dash matrices to an assemblage.

16. Apparatus for automatic justification as set forth in claim 15 wherein a decoder inhibit circuit is provided connected to said justify signal means for creating a signal on energization by a justify signal to prevent the addition of a spaceband at the end of a justifiable assemblage.

17. Apparatus for automatic justification as set forth in claim 16 wherein said means for creating a command for elevating includes means for creating a jog command for compacting matrices in an assemblage.

18. Apparatus for automatic justification as set forth in claim 17 wherein said decoder inhibit circuit is connected to said switching means for impressing a blocking signal on said decoder inhibitor when a jog command causes the addition of a spaceband and the removal of a justify signal to permit continued assemblage.

19. Apparatus for automatic justification as set forth in claim 14 wherein automatic indentation means are provided comprising switching circuit for sensing signals from a coded tape starting and stopping indentation of lines and having an off and on condition, second switching circuit responsive to the commencement of a succeeding assemblage and to the number of indentation matrices and means connected to said second switching circuit providing indentation commands and turning said second switching circuit off on completion of the designated number of indentation commands.

20. Apparatus for automatic justification as set forth in claim 19 wherein said second switching circuit is connected to said tape control means to prevent the addition of matrices except indentation matrices.

21. Apparatus for automatic justification as set forth in claim 14 wherein second switching means are provided for creating a rejustify signal in the justification zone indicating an unjustifiable assemblage, means for creating a signal returning an unprogrammed tape to the beginning of the unjustifiable assemblage, means for providing signals setting the rail and shift at the beginning of the unjustifiable assemblage, and means for creating a command elevating the unjustifiable assemblage for non-casting and commencing the reassemblage of the matrices.

22. Apparatus for automatic justification as set forth in claim 21 wherein means are provided connected to said rejustify switch means and to said means for determining justifiability of a set of matrices to provide thin space commands for increasing the spacing between groups of matrices.

23. Apparatus for automatic justification as set forth in claim 21 wherein means are provided and connected to said means for creating an elevation command and said rejustify switch means for creating a signal to prevent the casting of an elevated unjustifiable assemblage.

24. Apparatus for automatic justification as set forth in claim 21 wherein said signal sensing means senses spacebands and said means for creating a signal returning an unprogrammed tape to the beginning of an unjustifiable assemblage includes a counter connected to said signal sensing means to count spacebands added to an assemblage and spaceband codes sensed on a reversing tape and to match the added spacebands with the spaceband codes for determining the initial condition of the unprogrammed tape at the commencement of an assemblage.

25. Apparatus for automatic justification as set forth in claim 24 wherein means are provided connected between said counter means and said elevation means to create a reassemble signal on sensing the return of an unprogrammed tape to the initial condition and connected to said second switching means for activation to pass the reassemble signal to actuate said means for creating a command elevating an unjustifiable assemblage.

26. Apparatus for automatic justification of matrices assembled on a line-casting machine from an unprogrammed tape comprising a justified region switching means for creating a signal on assembled matrices entering a justification zone, means for receiving from an unprogrammed tape signals adding terminating matrices forming a justifiable assemblage, a justify signal means connected to said switching means and said signal receiving means for producing a justified signal on receiving a signal from said switching means and from said signal receiving means, tape control means connected to said justify signal means for actuation by a justify signal to create a signal stopping an unprogrammed tape, a delay circuit connected to said justify signal means for creating a command to jog the assemblage, and pulse generator means connected to said delay circuit and creating an elevation command to raise the assemblage for casting and being connected to said tape control means for impressing the elevation command thereon to remove the tape control signal and commence forward movement of the unprogrammed tape for assemblage of a succeeding set of matrices.

27. Apparatus for automatic justification of matrices assembled on a line-casting machine from an unprogrammed tape comprising a justified region switching means for creating a signal on assembled matrices entering a justification zone, means for sensing signals produced by spaceband, long dash or hyphen codes on an unprogrammed tape, a justify signal means connected to said switching means for receiving a signal on entry of an assemblage into a justification zone and connected to said signal sensing means for receiving a spaceband, long dash or hyphen signal after receipt of the justification signal to produce a justified signal, gate means connected to said justify signal means, a delay circuit connected to the output of said gate means to produce a jog command on receipt of a justified signal through said gating means, a pulse generator connected to the output of said delay circuit to produce an elevate command on receipt of said jog command from said delay circuit to raise a justifiable assemblage for casting, a tight line switching means for receipt of a signal created on the insertion of the last matrix in an assemblage, a rejustify signal means connected to said tight line switching means and to said signal sensing means for producing a rejustify signal when the last matrix is other than a spaceband, hyphen or long dash, a rejustify switching means connected to said rejustify signal means having two conditions of stability to receive said rejustify signal to switch the rejustify switching means from one condition to another, an up/down counter connected to said rejustify switching means and to said signal sensing means to receive spaceband, hyphen and long dash signals for adding counts to the counter on the forward movement of the tape and subtracting counts on the reverse movement of the tape to determine the first word of an unjustifiable assemblage, a rejustify elevate logic circuit connected to said counter for creation of a signal on return of an unprogrammed tape to the beginning of a rejected assemblage, said rejustify elevate logic circuit connected to said pulse generator through said gate means and delay circuit for creating an elevate command on return of the tape to the initial condition for elevating an unjustifiable assemblage.

28. Apparatus for automatic justification of matrices assembled on a line-casting machine from an unprogrammed tape comprising a rejustify switch means having two conditions of stability actuatable to the first condition by a justify signal and to the second condition by a rejustify signal to create a tight line command, means including a tape reader for sensing a justifiable assemblage to create a justify signal, tight line means for sensing an unjustifiable assemblage to create a rejustify signal, said justify signal means connected to said rejustify switch means for applying a justify signal to set said rejustify switch means to a first condition, said tight line means connected to said rejustify switch means for altering said switch means to the second condition to create a tight line command, tape return means connected to said rejustify switch means and to said reader for returning an unprogrammed tape to the first word on a tight line assemblage, assemblage rejection means connected to said rejustify switch means and to said tight line means to create a reassemble signal, and an elevate means connected to said reassemble means and said justify signal means for creating an elevate command to remove an assemblage of matrices on receipt of a signal from said reassemble means or said justify signal means.

29. Apparatus for automatically indenting two or more assemblages in a line-casting machine comprising means for sensing indentation starting and stopping signals from an unprogrammed tape, switching means connected to said sigal sensing means and having an off and on condition, gating means connected to said switching means and having means for receiving signals on the commencement of a line, a second switching means connected to said gating means and having an on and off condition, a pulse generator for creating indentation commands for adding indentation matrices to an assemblage, counter means connected to said pulse generator means for counting indentation commands, comparing means setting the number of indentation commands to be created and connected to said counter and to said second switching means to turn said second switching means off on creation of the required indentation commands.

30. Apparatus for automatically indenting two or more assemblages in a line-casting machine as set forth in claim 29 wherein means are provided for connecting said second switching means to a tape control means for stopping a tape when in the on condition and starting a tape when in an off condition.

References Cited

UNITED STATES PATENTS 3,208,040 9/1965 Swenson ------------ 340—147

JOHN W. CALDWELL, Primary Examiner

HAROLD I. PITTS, Assistant Examiner

U.S. Cl. X.R.

199—13; 235—61.11; 318—28; 340—168